United States Patent
Daum et al.

(10) Patent No.: US 8,043,597 B2
(45) Date of Patent: Oct. 25, 2011

(54) PROCESS AND APPARATUS FOR THE COMBUSTION OF SULFUR

(75) Inventors: Karl-Heinz Daum, Mainz (DE); Wolf-Christoph Rauser, Frankfurt am Main (DE); Wolfram Schalk, Neu-Anspach (DE)

(73) Assignee: Outotec Oyj, Espoo (FI)

( * ) Notice: Subject to any disclaimer, the term of this patent is extended or adjusted under 35 U.S.C. 154(b) by 20 days.

(21) Appl. No.: 12/279,034

(22) PCT Filed: Feb. 9, 2007

(86) PCT No.: PCT/EP2007/001128
§ 371 (c)(1),
(2), (4) Date: Aug. 11, 2008

(87) PCT Pub. No.: WO2007/090671
PCT Pub. Date: Aug. 16, 2007

(65) Prior Publication Data
US 2009/0068088 A1    Mar. 12, 2009

(30) Foreign Application Priority Data

Feb. 10, 2006 (DE) .......................... 10 2006 006 460

(51) Int. Cl.
*C01B 17/48* (2006.01)
*C01B 17/50* (2006.01)
*C01B 17/54* (2006.01)

(52) U.S. Cl. ....................... 423/543; 423/539

(58) Field of Classification Search .................. 423/539, 423/543, 540, 542
See application file for complete search history.

(56) References Cited

U.S. PATENT DOCUMENTS

| 3,879,530 | A | | 4/1975 | Perret et al. | |
|---|---|---|---|---|---|
| 4,376,108 | A | * | 3/1983 | Lowiciki et al. | ............... 423/540 |
| 4,715,301 | A | * | 12/1987 | Bianca et al. | ................. 110/347 |
| 4,966,757 | A | | 10/1990 | Lewis et al. | |
| 5,807,530 | A | * | 9/1998 | Anderson | ....................... 423/543 |

FOREIGN PATENT DOCUMENTS

| DE | 1087577 | 8/1960 |
|---|---|---|
| DE | 1948754 | 5/1971 |
| DE | 1667421 | 2/1972 |

(Continued)

OTHER PUBLICATIONS

Babara Elvers et al. "Ullmann's Encyclopedia of Industrial Chemistry", Fifth, Completely Revised Edition, 1994, vol. A25. VCH, pp. 567-577.*

Babara Elvers et al. "Ullmann's Encyclopedia of Industrial Chemistry", Fifth, Completely Revised Edition, 1994, vol. A25, VCH, pp. 567-577.

Sander U H F et al. "Production from elemental sulphur" Sulphur, Sulphur Dioxide and Sulphuric Acid. Introduction to their Industrial Chemistry and Technology, London, British Sulphur Corporation, GB, 1984, pp. 168-176, XP0006085.

(Continued)

*Primary Examiner* — Jerry A Lorengo
*Assistant Examiner* — Jared Wood
(74) *Attorney, Agent, or Firm* — Leydig, Voit & Mayer, Ltd.

(57) ABSTRACT

A process for a combustion of sulfur with an oxygen-containing gas to produce sulfur dioxide. The process includes introducing the sulfur and the oxygen-containing gas to a furnace. The sulfur is evaporated and subsequently a portion of the sulfur is oxidized to sulfur dioxide under sub-stoichiometric conditions in a first portion of the furnace. The sulfur dioxide formed in the first furnace portion is introduced together with any unoxidized sulfur to a second portion of the furnace which is disposed adjacent to the first furnace portion. The sulfur dioxide and unoxidized sulfur are subjected to post-combustion with the oxygen-containing gas in an inlet of a downstream waste heat boiler.

15 Claims, 8 Drawing Sheets

FOREIGN PATENT DOCUMENTS

| | | |
|---|---|---|
| DE | 2063021 | 7/1972 |
| DE | 2063021 A1 * | 7/1972 |
| EP | 0762990 | 3/1997 |
| GB | 827627 | 2/1960 |
| GB | 1368210 | 9/1974 |

OTHER PUBLICATIONS

International Search Report for International No. PCT/EP2007/001128 mailed on Aug. 31, 2007.

* cited by examiner

PROCESS AND APPARATUS FOR THE COMBUSTION OF SULFUR

CROSS REFERENCE TO RELATED APPLICATIONS

This application is a U.S. National Phase application under 35 U.S.C. §371 of International Application No. PCT/EP2007/001128, filed on Feb. 9, 2007 and claims benefit to German Patent Application No. DE 10 2006 006 460.7, filed on Feb. 10, 2006. The International Application was published in English on Aug. 16, 2007 as WO 2007/090671 A2 under PCT Article 21(2).

FIELD

The present invention relates to a process and an apparatus for the combustion of sulfur with oxygen-containing gases, such as air, for producing sulfur dioxide, wherein sulfur and combustion air are supplied to a furnace and wherein the sulfur is evaporated and subsequently oxidized in a first portion of the furnace under substoichiometric conditions.

BACKGROUND

Sulfur dioxide may be used for producing sulfuric acid or liquid sulfur trioxide and generally is produced by calcining/smelting sulfur-containing ores or by combustion of elementary sulfur. The combustion generally is effected with atmospheric air, but air enriched with oxygen or even pure oxygen are used as well. For cost reasons, however, the use of pure oxygen for the combustion of sulfur mostly may not be expedient. Nowadays, sulfur itself is used almost exclusively in liquid form and in general is supplied as a liquid and stored temporarily. The liquid sulfur is supplied to the combustion furnace with temperatures of 140 to 150° C., at which its viscosity is low enough to provide for injection via nozzles. In order to optimize the combustion, the liquid sulfur is atomized in the furnace and is thoroughly mixed with the combustion air.

The combustion of sulfur requires equal molar quantities of sulfur and oxygen. With ambient air, which contains 20.95 vol-% of $O_2$, an $SO_2$ gas with a maximum of 20.5 vol-% of $SO_2$ can theoretically be obtained with a stoichiometric combustion of sulfur. To ensure a complete combustion of sulfur, an excess of air is usually supplied. Problems resulting from unburnt sulfur, which is condensed and deposited in colder parts of the plant, thus can be avoided. The hyperstoichiometric combustion is described for instance in Ullmann's Encyclopedia of Industrial Chemistry, $5^{th}$ edition, 1994, vol. A25, p. 574 f. The combustion is effected in a horizontally arranged cylindrical furnace, which has a refractory lining and on its end face includes a centrally arranged system of burners. The liquid sulfur is atomized and mixed with the combustion air and burns at temperatures of 600 to 1,600° C. in dependence on the desired sulfur dioxide concentration. Subsequent to the sulfur furnace, a waste heat boiler is provided, before the gas is supplied to a sulfuric acid contact plant. The converter of the contact plant generally employs initial concentrations of sulfur dioxide of 10 to 12 vol-%, which must possibly be adjusted by means of further equipment.

EP 0 762 990 B1 also describes the hyperstoichiometric combustion of sulfur.

A method and an apparatus for the combustion of liquid sulfur into sulfur dioxide in a burner furnace is described in U.S. Pat. No. 3,879,530. The liquid sulfur and the primary combustion-supporting air are injected concurrently in a first part of the combustion furnace. A secondary combustion-supporting gas is introduced further downstream of the furnace in the combustion chamber prior to the outlet of the burned gases containing sulfur dioxide into an adjoining boiler.

At combustion temperatures above 1,100° C., the formation of nitrogen oxides ($NO_x$) increases strongly, even if less free oxygen is available for the formation of nitrogen oxides due to the higher sulfur dioxide concentration. Only above a sulfur dioxide concentration of 18 vol-% does the formation of $NO_x$ decrease again due to the lack of oxygen. The formation of nitrogen oxides therefore limits the preheating of the combustion gases in conventional sulfur combustion systems, as the combustion temperature increases. This impairs the economy of the plants.

For producing gases with high sulfur dioxide concentrations and very low $NO_x$ content, a two-stage plant is proposed as described in DE 1 948 754, in which the elementary sulfur is first burnt under substoichiometric conditions (oxygen debt). Upon passing through a heat exchanger, the produced gases containing sulfur dioxide and sulfur are then subjected to post-combustion with oxygen-containing gases in a further apparatus at about 1000° C. In terms of plant construction, however, this multistage installation is quite complex and hence expensive.

SUMMARY

An aspect of the present invention is to produce gases with a high sulfur dioxide concentration with simple means and at the same time largely minimize the formation of nitrogen oxides ($NO_x$).

In an embodiment, the present invention provides a process for a combustion of sulfur with an oxygen-containing gas to produce sulfur dioxide. The process includes introducing the sulfur and the oxygen-containing gas to a furnace. The sulfur is evaporated and subsequently a portion of the sulfur is oxidized to sulfur dioxide under sub-stoichiometric conditions in a first portion of the furnace. The sulfur dioxide formed in the first furnace portion is introduced together with any unoxidized sulfur to a second portion of the furnace which is disposed adjacent to the first furnace portion. The sulfur dioxide and unoxidized sulfur are subjected to post-combustion with the oxygen-containing gas in an inlet of a down-stream waste heat boiler.

BRIEF DESCRIPTION OF THE DRAWINGS

The present invention is described in greater detail below on the basis of exemplary embodiments with reference to the drawings in which.

DETAILED DESCRIPTION

Figure 1:
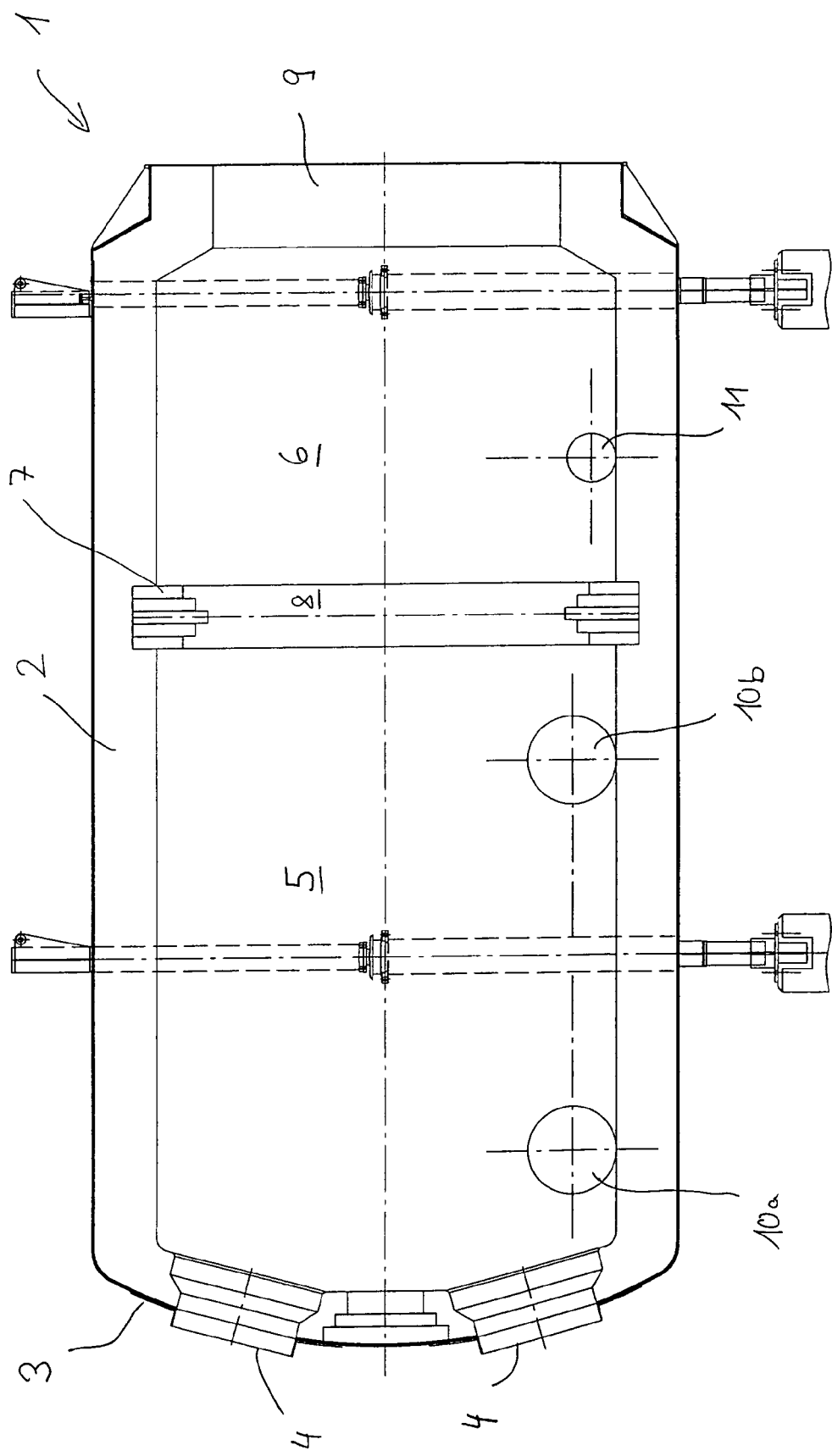
FIG. 1 schematically shows a section through a sulfur combustion furnace in accordance with a first embodiment of the invention with an orifice, FIG. 2a schematically shows the furnace of FIG. 1 with an illustration of the supply system for the combustion air.

In an embodiment of the present invention, there is first effected a sub-stoichiometric combustion of sulfur and then a post-combustion at the outlet of the second chamber or in the inlet portion of the waste heat boiler. The second chamber is provided directly subsequent to the first combustion chamber of the sulfur furnace. An interposed heat exchanger can be omitted. Nevertheless, the formation of nitrogen oxides can be minimized, as the retention time at high temperatures can be too low for the formation of significant amounts of nitrogen oxides due to the rapid cooling in the waste heat boiler. In the first portion of the furnace, the formation of $NO_x$ can be excluded as a result of the lack of oxygen. In the second portion this can be effected by the immediate rapid cooling of the gas in the waste heat boiler.

because the substoichiometric combustion in the first portion of the furnace relies on gases being mixed with the sulfur very well, so that the oxygen can be consumed completely and no nitrogen oxides can be formed, an aspect of the present invention is to introduce combustion air into the furnace tangentially. This can promote turbulence in the combustion chambers and a thorough mixing of the gases. The gas stream can then pass through the furnace spirally and in an axial direction thereof.

In an embodiment of the present invention, the oxygen-containing gases can be introduced into the first and second portions of the furnace with a parallel sense of rotation. Alternatively, it is also possible to introduce the gases into the second chamber of the furnace with the opposite sense of rotation. This can be effected in that the combustion air supply duct extending into the second furnace chamber opens at the furnace wall opposite the supply duct extending into the first furnace chamber.

In an embodiment of the present invention, the sulfur dioxide concentration obtained in the first and second portions of the furnace can be adjusted by controlling the amount of air and/or sulfur supplied. The volume flow rates can be chosen such that in the first portion of the furnace a sulfur dioxide concentration of about 20 to 21 vol-%, for example about 20.5 vol-% is obtained. Above a sulfur dioxide concentration of 18 vol-%, the formation of nitrogen oxides can decrease rapidly due to the low content of free oxygen, while it is hardly influenced by the retention time.

In an embodiment of the present invention, sufficient oxygen is supplied in the second portion of the furnace by means of oxygen containing gases so that a sulfur dioxide concentration of 6 to 95%, for example 9 to 35 vol-% or 12 to 18 vol-% is obtained at the end of the combustion. If a sulfur dioxide concentration of 12 vol-% is adjusted, the sulfur dioxide obtained can directly be supplied to a contact boiler of the sulfuric acid plant. If a sulfuric acid concentration of 18 vol-% is chosen, all the sulfur can be consumed, and a deposition in succeeding parts of the plant can be excluded. Due to the substantially higher inlet temperature of the waste heat boiler (1,600° C. instead of 1,150° C.), the heat recovery system requires a smaller heat-exchange surface, so that the capital costs can be reduced. Behind the waste heat boiler, the $SO_2$ concentration can be reduced by supplying air, the concentration to be adjusted depending on the succeeding equipment.

In the first portion of the furnace, the combustion of sulfur can be effected at about 1,000 to 1,800° C., whereas the post-combustion at the outlet of the second portion of the furnace or at the inlet of the waste heat boiler can begin at about 1,000 to 1,800° C. Upon inlet into the waste heat boiler an immediate rapid cooling of the supplied gases can be effected. A combustion temperature of about 1,000° C. at the start of the post-combustion in the second portion can be chosen, for example when a sulfur dioxide concentration of 12 vol-% is desired, whereas with a sulfur dioxide concentration of 18 vol-% a combustion temperature of about 1,600° C. can be set for the start of the post-combustion in the second portion. These temperatures are based on a combustion air inlet temperature of about 100° C. The temperature can vary with varying air temperature. In any case, due to the low concentration of the unburnt sulfur (sulfur vapor) in the outlet of the second chamber of the furnace and due to the short retention time in the second chamber of the furnace, a combustion temperature can be chosen, such that due to the immediate cooling in the waste heat boiler the formation of nitrogen oxides can be minimized. The retention time before the cooling below 1,000° C. can be insufficient to form a significant amount of $NO_x$. The retention time in the second portion of the furnace can be less than 0.5 s, for example less than 0.3 s. In the waste heat boiler as fast as possible a cooling below 800° C., for example below 700° C. or below 600° C. can be effected. The retention time until a temperature of about 1,000° C. can be reached is less than 1 s, for example less than 0.7 s.

To promote the thorough mixing of sulfur with the combustion gases, the sulfur preferably can be introduced into the first portion of the furnace in liquid form and can be atomized by means of air when entering the furnace. In accordance with the present invention, this can be effected by means of rotary atomizers, ultrasonic atomizers, or by supplying sulfur through lances.

An increased turbulence and hence an even better mixing of the gases in the first portion of the furnace can be achieved in an embodiment of the present invention where the stream of air supplied to the first portion of the furnace is supplied to the furnace at one or more, for example in two positions located one behind the other in axial direction of the furnace.

In an embodiment, the present invention also applies to an apparatus for the combustion of sulfur, comprising a furnace at the end face of which a system of burners can be provided, and comprising ducts for supplying sulfur as well as oxygen-containing gases, such as air, wherein the furnace includes a first portion and an adjoining second portion, to each of which oxygen-containing gases can be supplied for the combustion of sulfur.

The ducts for supplying the combustion air can be tangentially open into the first and second portions, in order to support the thorough mixing of sulfur and combustion air by means of turbulences.

In the ducts for supplying combustion air to the first and second portions, control valves for adjusting the volume flow rates to be supplied can be provided in accordance with an embodiment of the present invention. Thereby, the ratio of the volume flow rates supplied to the individual chambers can also be controlled.

In an embodiment of the present invention, the first and second portions can be separated from each other by an orifice. The orifice can support the turbulence when the gas leaving the first portion enters the second portion and nevertheless provides a certain separation of the regions, so that the concentrations can be adjusted selectively. In another embodiment, the orifice can be omitted, the delimitation of the furnace chambers can then be effected by controlling the streams of air supplied to the portions.

FIG. 1 schematically shows a furnace 1 for the combustion of sulfur for producing sulfur dioxide in accordance with a first embodiment of the present invention. The furnace 1 has a furnace wall 2 with a refractory lining which can be designed as a cylindrical furnace arranged horizontally. With a confined space, however, the furnace can also be arranged vertically.

In the end wall 3 of the furnace 1, one or more non-illustrated atomizers 4 are provided, by means of which liquid sulfur, which can be supplied via a non-illustrated duct, can be atomized to form small droplets which are mixed with the combustion gases in the furnace, are evaporated and burnt (oxidized). The atomizers 4 can constitute rotary atomizers, for instance in the form of the Luro burner developed by Lurgi, as described in Ullmann's Encyclopedia of Industrial Chemistry, 5$^{th}$ edition 1994, vol. A25, p. 575.

The atomizer can also constitute an ultrasonic atomizer, pressure atomizer or binary burner, as they are used conventionally in the combustion of sulfur for finely atomizing the sulfur and thoroughly mixing the same with the combustion air. In an illustrated embodiment, two atomizers 4 are provided in the end wall 3 of the furnace 1, but it is also possible to provide merely one centrally arranged atomizer 4 or three or more atomizers distributed around the center of the end wall 3.

The interior of the furnace 1 can be divided into a first portion 5 (front chamber) and a second portion 6 (post-combustion chamber). Generally, the volume of the second portion 6 can be about one third or less of the volume of the furnace 1, but the present invention is not limited thereto. In an illustrated embodiment, an orifice (weir) 7 can be provided between the portions 5, 6, which separates the portions 5, 6 from each other, but includes a large enough passage 8, through which the gas mixture can pass from the first portion 5 into the second portion 6. The diameter of the passage 8 can be for instance about 80% of the inside diameter of the furnace in the first or second portion 5, 6. Via an outlet opening 9, the furnace 1 can be connected with a waste heat boiler (not shown in FIG. 1) or some other equipment, through which the gas mixture containing sulfur dioxide can be supplied for instance to a contact plant for the production of sulfuric acid.

Figure 2B:
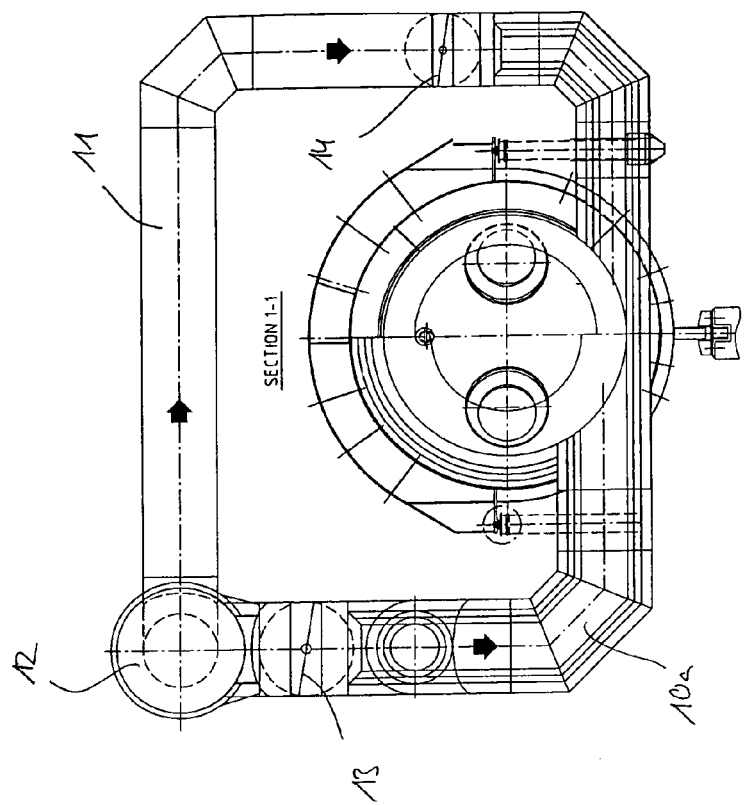
FIG. 2b shows a view of the furnace with burner openings, FIG. 3a schematically shows a sulfur combustion furnace in accordance with a second embodiment of the invention without an orifice.

Supply ducts 10a, 10b, through which combustion air can be supplied, open into the first portion 5. A supply duct 11, likewise for supplying combustion air, can open into the second portion 6. Each of the supply ducts 10a, 10b and 11 can tangentially open into the first portion 5 and into the second portion 6, respectively, the supply duct 11 for the second portion 6 opening into the furnace 1 at the furnace wall opposite the supply ducts 10a, 10b, as can be seen in FIG. 2b. The supply ducts 10a, 10b and 11 together can be supplied with combustion air via a common supply tube 12, the volume flow entering the furnace each being controlled via control valves 13 and 14, which can each be provided in the supply ducts 10, 11. The supply ducts 10a, 10b can branch out behind the control valve 13, so that substantially the same volume flow can be supplied to each of them and introduced into the first portion 5 of the furnace 1 at points located axially one behind the other.

Operation of the embodiments described above will be explained below.

Liquid sulfur is supplied to the furnace 1 via the atomizers 4 with a temperature of, for example, 140 to 150° C. and is atomized with primary air. Via the supply openings 10a, 10b, for example, dry ambient air can be tangentially introduced into the first portion 5. The air should provide the oxygen necessary for combustion. Instead of ambient air, air enriched with oxygen or even pure oxygen can of course be used as well. When the pre-sent application makes reference to air which is introduced into the furnace, all oxygen-containing gases therefore are covered.

Since the stream of sulfur can be supplied in axial direction and, when using a rotary atomizer, can additionally includes a radial component, the sulfur and the tangentially supplied combustion air can be mixed very well and spirally move in axial direction of the furnace 1.

Via the supply ducts 10a, 10b, ambient air can be supplied in such an amount that in the first portion 5 a slight substoichiometric condition (oxygen debt) is obtained, for example in a molar ratio $O_2$:S of 0.95 to 0.99. As a result, the sulfur reacts with all the oxygen available, so that even at the high temperatures of 1600 to 1800° C., which exist during the combustion, no nitrogen oxides ($NO_x$) will be formed.

In the first portion 5, a gas containing sulfur dioxide can be obtained with a sulfur dioxide concentration of about 20.5 vol-%. Together with the still unburnt sulfur (sulfur vapor), this gas flows through the passage 8 into the second portion 6, in which a sufficient amount of dried ambient air is supplied through the supply duct 11 before leaving the second portion 6 through the outlet opening 9, in order to completely convert the remaining sulfur vapor into sulfur dioxide. The total retention time of the gas in the furnace 1 is less than 2 s, for example less than 1 s or less than 0.8 s.

Figure 6:
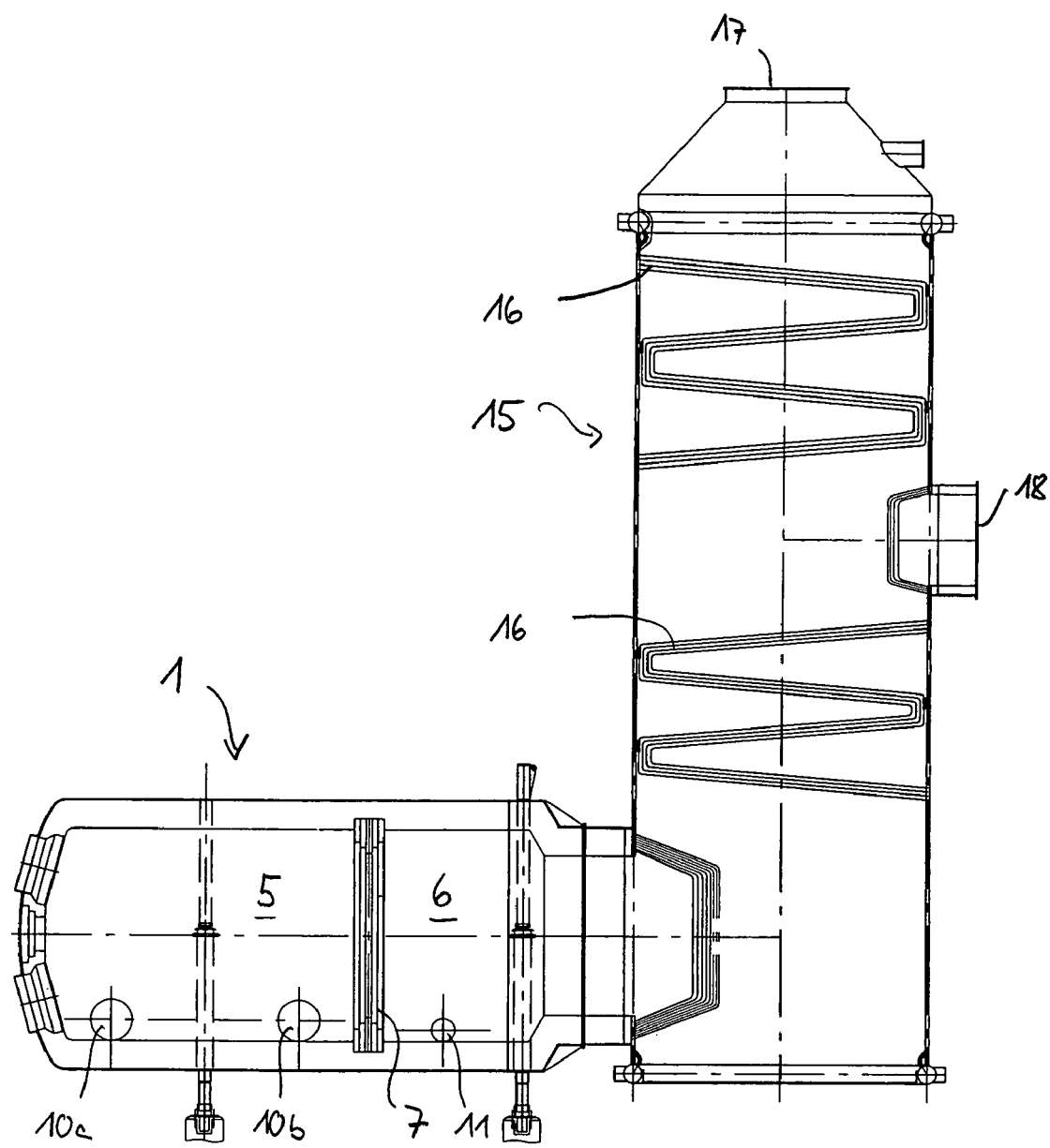
FIG. 6 shows a sectional view of the furnace similar to FIG. 1 with a down-stream waste heat boiler.

FIG. 6 shows that downstream of the furnace 1, a waste heat boiler 15 can be provided directly adjacent to the second portion 6 of furnace 1. The gas exiting the second portion 6 enters the waste heat boiler 15 where it can be cooled while heating water flowing through ducts 16 to create high pressure steam in a standard heat recovery system. The cooled gas stream then exits the waste heat boiler 15 through openings 17 and, optionally, 18 can be supplied to the contact boiler of a sulfuric acid plant or other suitable equipment.

As the waste heat boiler can be provided directly downstream of the furnace 1 the temperature of the gas stream can drop rapidly below 1,000° C. due to the heat radiation in the waste heat boiler 15 which has wall temperatures in the range of about 300 to 350° C. Due to the low retention time of the gas stream in the second portion 6 of the furnace 1 at a temperature above 1.000° C., the formation of considerable amounts of nitrogen oxides can be suppressed. A temperature of below 1,000° C. should be reached in the waste heat boiler in less than 0.5 s.

The resulting sulfur dioxide concentration can be adjusted in dependence on the equipment succeeding the furnace 1. In the case of a combustion at about 1,000° C. in the second portion 6, the sulfur dioxide concentration can for instance be adjusted to about 12 vol-%, so that the gas flowing out already has a concentration suitable for the contact boiler of the sulfuric acid plant. Due to the low combustion temperature and the simultaneous cooling in the subsequent waste heat boiler, the formation of nitrogen oxides is minimized.

In the case of a beginning post-combustion in the outlet of the second portion with temperatures of about 1,600° C., a gas concentration of about 18 vol-% of sulfur dioxide in the furnace exhaust gas can be achieved, whereby it can be ensured that in the waste heat boiler 15 all the sulfur has been consumed. Behind the waste heat boiler 15, a sulfur dioxide concentration suitable for the sulfuric acid plant can be adjusted by additionally supplying air.

Figure 2A:
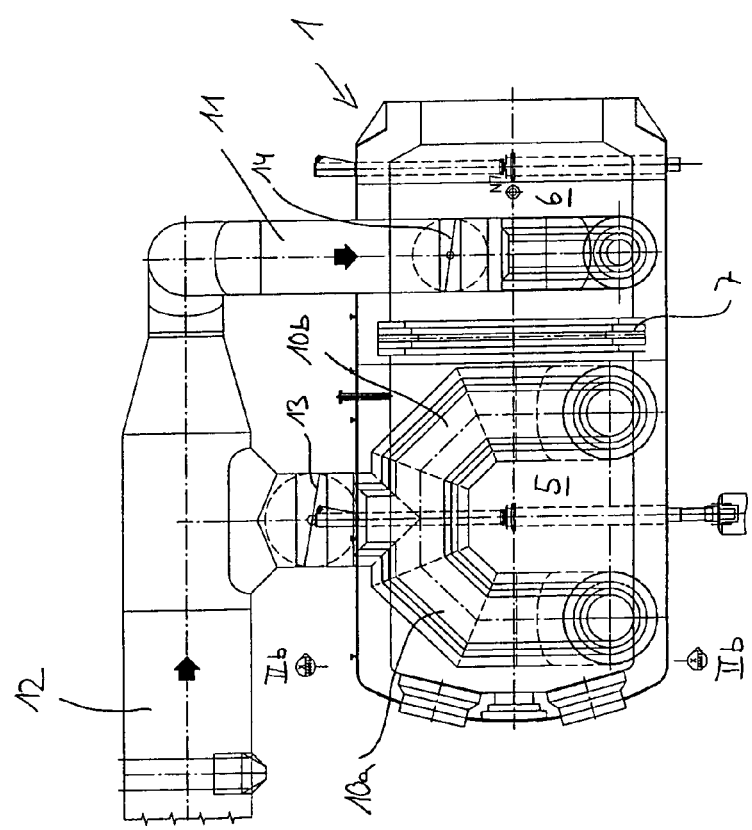

In FIGS. 3 to 5, further embodiments of the present invention are shown. The operation of these embodiments substantially corresponds to the embodiment as shown in FIGS. 1 and 2, so that in so far reference is made to the above description. In addition, the same reference numerals are used for the same components, and subsequently merely the differences of these embodiments with respect to the above embodiment as shown in FIGS. 1 and 2 will be explained.

Figure 3B:
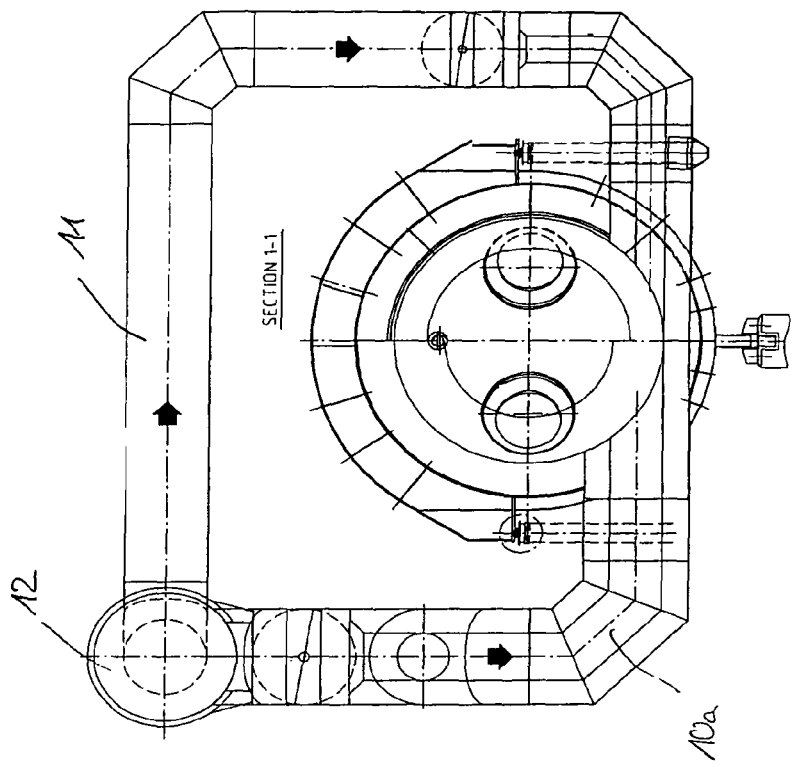
FIG. 3b shows a view of the furnace with burner openings, FIG. 4a schematically shows a sulfur combustion furnace in accordance with a third embodiment of the invention with an orifice
Figure 3A:
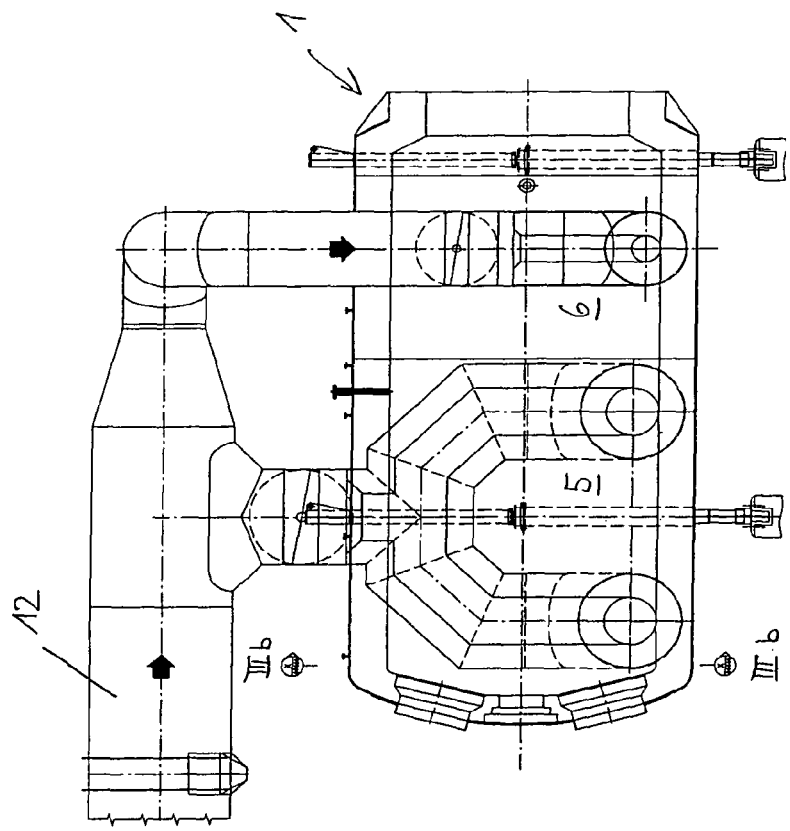

FIGS. 3*a* and 3*b* show an embodiment of the present invention without the orifice 7 provided in the first embodiment. The first portion 5 and the second portion 6 can be defined by the control of the supply of combustion air by means of the control valves 13, 14. The remaining operation of said embodiment corresponds to that of the above embodiment.

Figure 4C:
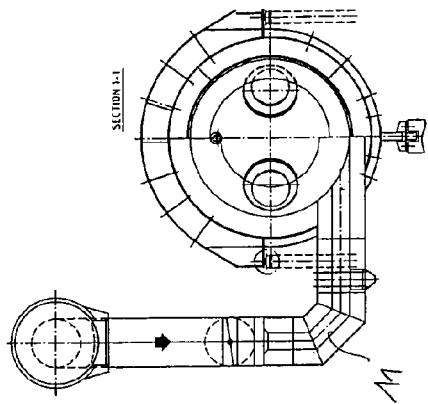
FIG. 4c shows a view of the furnace with burner openings and a gas supply to the second chamber, FIG. 5a schematically shows a sulfur combustion furnace in accordance with a fourth embodiment of the invention without an orifice.
Figure 4B:
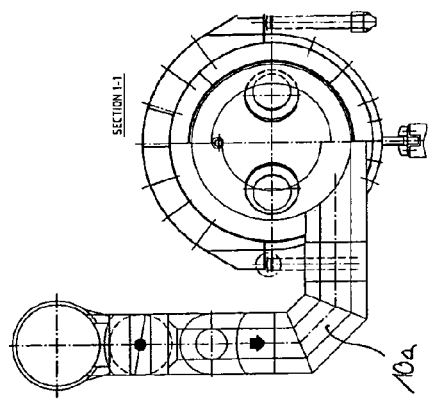
FIG. 4b shows a view of the furnace with burner openings.
Figure 4A:
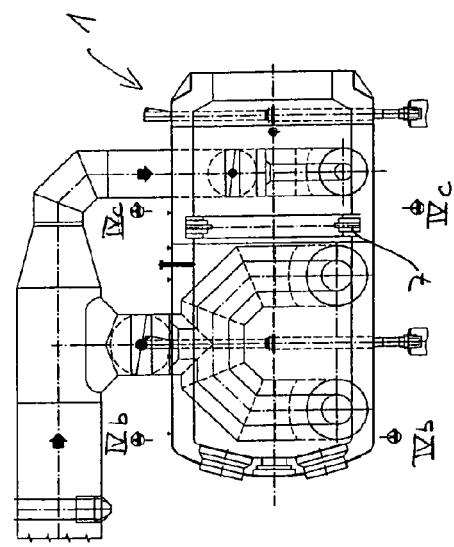

FIGS. 4*a* to 4*c* show another embodiment of the present invention, the supply of combustion air being effected via the supply ducts 10*a*, 10*b*, 11 to the first and second portions 5, 6, respectively, but not via the opposed side walls of the furnace 1. Rather, the supply ducts 10*a*, 10*b* and 11 each open on the same side of the furnace 1, so that the stream of air entering the furnace tangentially, which spirally moves forward in axial direction of the furnace 1, extends in the first and second portions 5, 6 with a parallel direction of rotation.

Figure 5C:
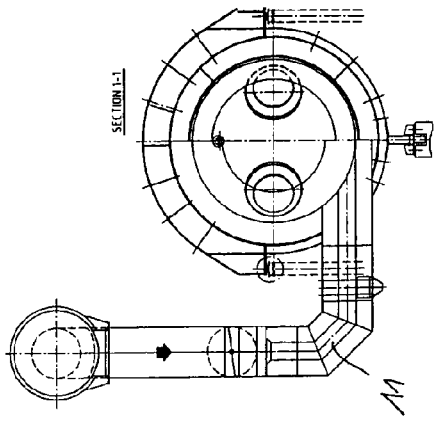
FIG. 5c shows a view of the furnace with burner openings and a gas supply to the second chamber.
Figure 5B:
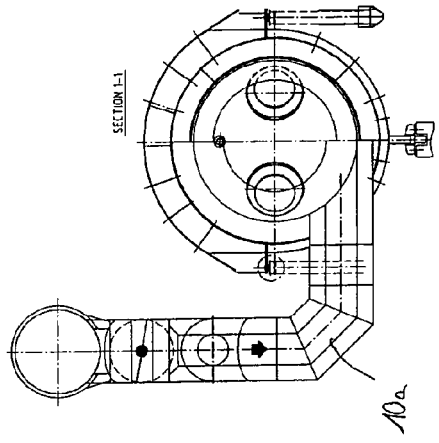
FIG. 5b shows a view of the furnace with burner openings.
Figure 5A:
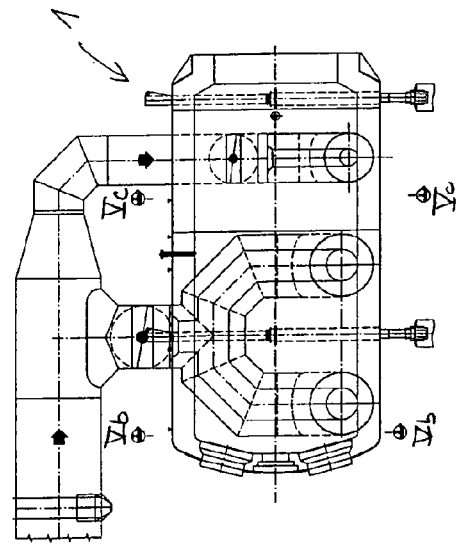

In another embodiment of the present invention as shown in FIGS. 5*a* to 5*c*, the combustion air is introduced into the first and second portions 5, 6, respectively, on the same side of the furnace 1 similar to that described above. However, the furnace 1 does not include the orifice 7 provided above.

Figure 7:
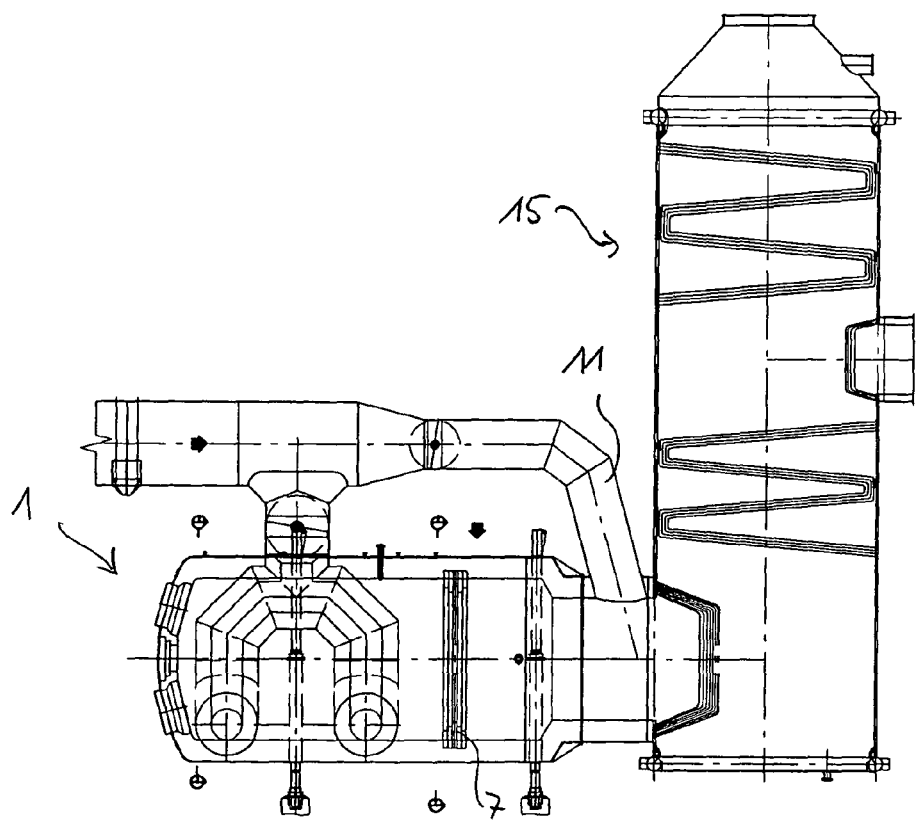
FIG. 7 shows a view of the furnace with the waste heat boiler wherein the combustion air is introduced into the inlet portion of the waste heat boiler.
Figure 8:
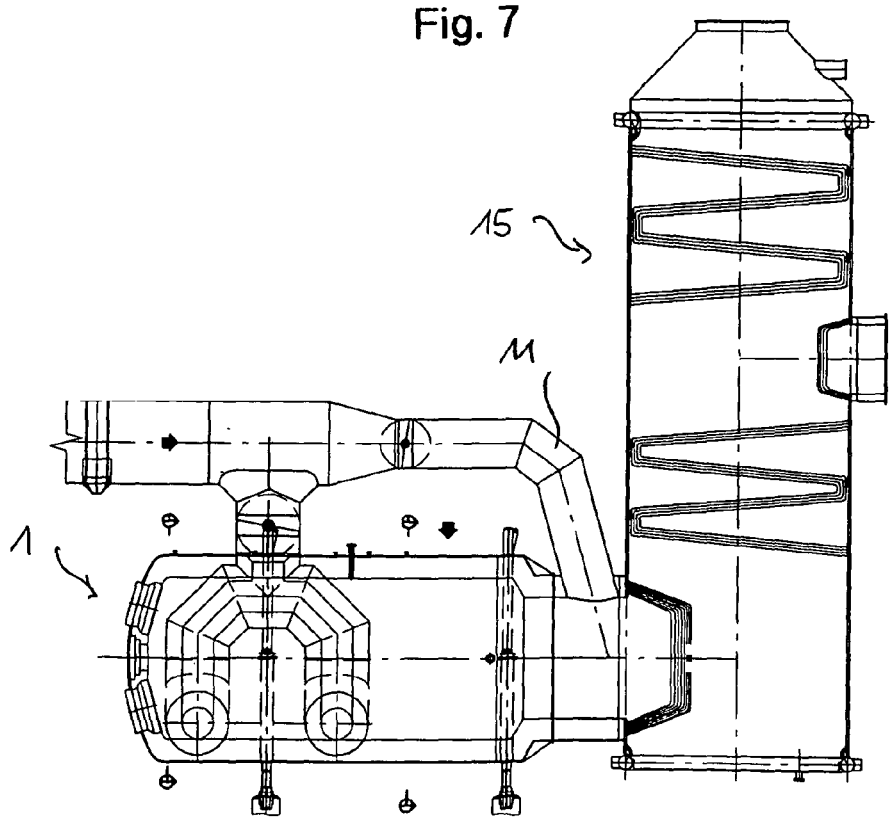
FIG. 8 shows a view of the furnace with the waste heat boiler wherein the combustion air is introduced into the inlet portion of the waste heat boiler and wherein the furnace does not comprise an orifice.

In an embodiment of the present invention shown in FIG. 7, the combustion air can be entered directly into the inlet portion of the waste heat boiler 15 via the duct 11. Thereby, the retention time of the gas stream at a temperature of above 1,000° C. can be even further reduced and consequently the formation of nitrogen oxides can be additionally suppressed. As in the embodiments of FIGS. 1 and 4, the furnace 1 may comprise an orifice 7 between the first and second portions 5, 6 (FIG. 7). Alternatively, the portions 5, 6 may not be separated by an orifice (FIG. 8), similar to the embodiments of FIGS. 3 and 5.

As a result of the two-stage configuration of the combustion of sulfur with a substoichiometric combustion in the first portion 5 and a subsequent beginning post-combustion in the outlet of the second portion 6 (or even in the inlet portion of the waste heat boiler 15 only) of the sulfur not yet burnt in the first portion 5, a gas with a high sulfur dioxide concentration can be achieved by means of the present invention, the formation of nitrogen oxides largely being avoided by the immediate cooling in the waste heat boiler and thus an insufficient retention time at high temperatures.

EXAMPLE 1

Figure 9:
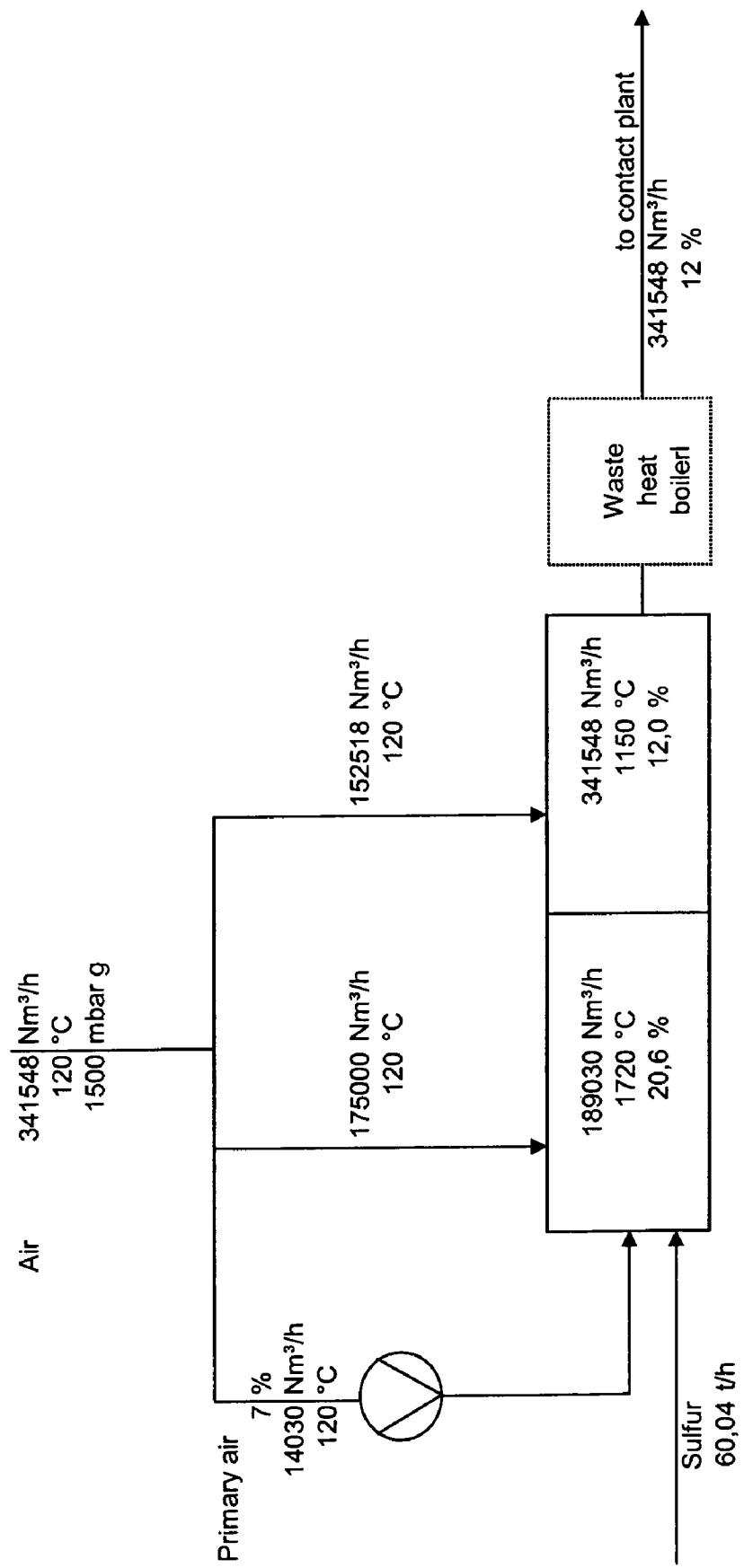
FIG. 9 shows the flow diagram of the process of the invention in accordance with Example 1.

FIG. 9 shows a flow diagram of the process of the present invention, by means of which a gas containing sulfur dioxide with a concentration of 12 vol-% of sulfur dioxide can be obtained. For the process, each of the first to fourth embodiments of a sulfur combustion furnace described with reference to FIGS. 1 to 5 can be used.

To the combustion furnace 1, 60.04 t/h of sulfur were supplied, which were introduced into the furnace in atomized form by means of 14,030 Nm$^3$/h of primary air with a temperature of 120° C. Into the first portion 5 of the furnace, 175,000 Nm$^3$/h of ambient air with a temperature of 120° C. were charged, whereas to the second portion 6 of the furnace 152,518 Nm$^3$/h of ambient air with a temperature of 120° C. were supplied. The total retention time in the furnace 1 was less than 0.6 s, in the second portion less than 0.2 s.

In the first portion 5, a sulfur dioxide concentration of 20.5% was obtained with a combustion temperature of 1,700 to 1,800° C., whereas in the outlet of the second portion 6 or in the inlet of the waste heat boiler 15 a sulfur dioxide concentration of 12 vol-% was achieved, which corresponds to the initial concentration of the converter of the sulfuric acid plant, so that the furnace exhaust gas can directly be supplied to the sulfuric acid plant upon adjustment of the desired temperature. Due to the low retention time of less than 0.2 s in the second portion 9 of the furnace and the rapid cooling to about 500° C. in the waste heat boiler the formation of nitrogen oxides can be efficiently avoided.

EXAMPLE 2

Figure 10:
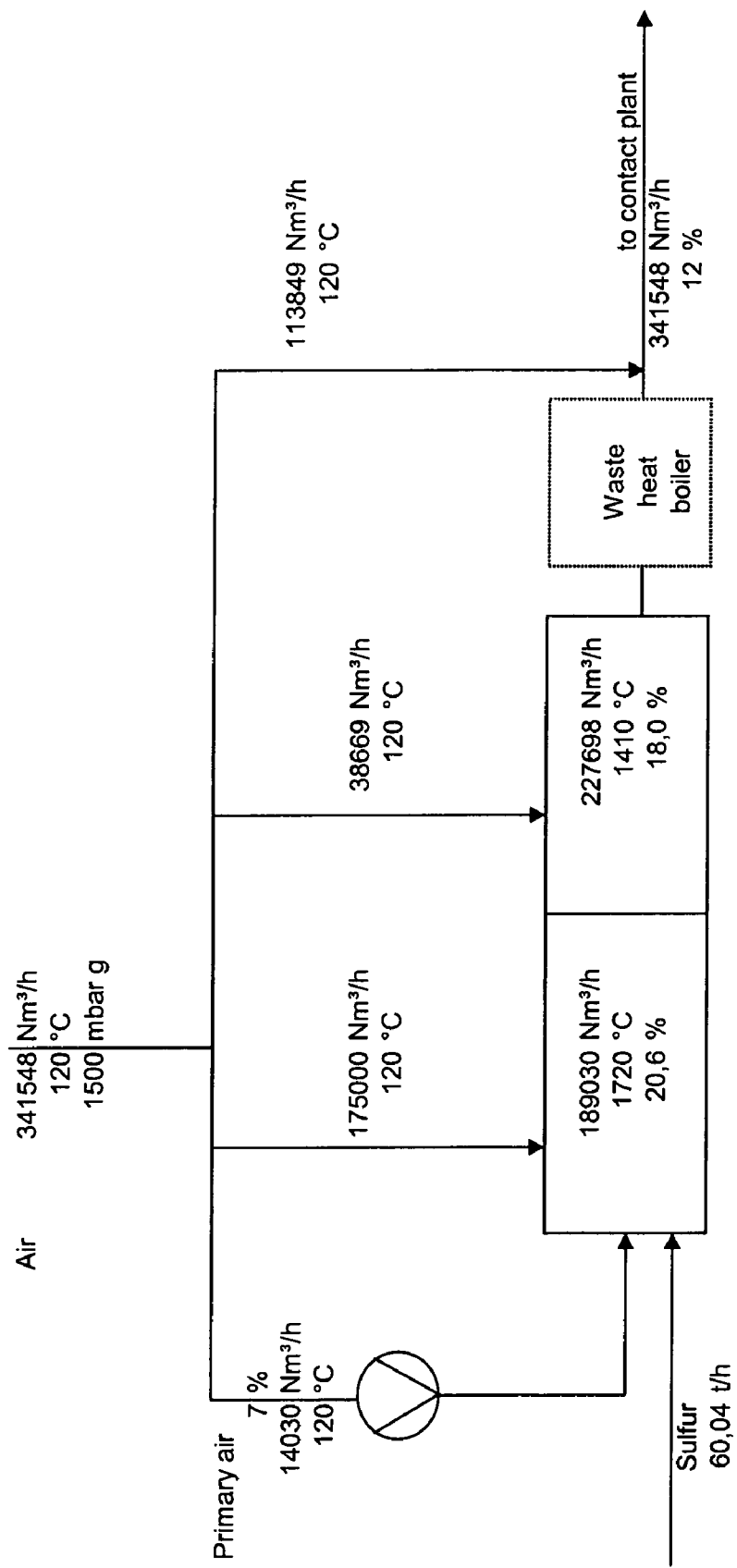
FIG. 10 shows the flow diagram of the process of the invention in accordance with Example 2.

In the flow diagram of a second experiment, which is shown in FIG. 10, the conditions in the first portion 5 of the furnace 1 correspond to those of the first example. However, the supply of combustion air in the outlet of the second portion 6 was reduced to 38,669 Nm$^3$/h, so that a sulfur dioxide concentration of 18% was obtained at the outlet of portion 6. This ensures that all the sulfur vapor, which has passed from the first portion 5 into the second portion 6, is consumed in the outlet of the second portion 6 or in the inlet of the waste heat boiler 15. The temperature of the gas stream when entering the waste heat boiler 15 is about 1,600° C. In the waste heat boiler 15 the temperature drops rapidly and a temperature of less than 1,000° C. is reached in less than 0.5 s. Accordingly, the retention time at high temperatures is too short as to form significant amounts of nitrogen oxides.

As a sulfur dioxide concentration of 18 vol-% is not suitable for entrance into a conventional sulfuric acid contact plant, the sulfur dioxide concentration is decreased again to 12 vol-% by adding for instance 113,849 Nm$^3$/h of ambient air with a temperature of 120° C. This gas mixture can then be supplied to the sulfur contact plant.

The invention claimed is:

1. A process for a combustion of sulfur with an oxygen-containing gas to produce sulfur dioxide, the process comprising:
    introducing the sulfur and the oxygen-containing gas to a furnace;
    evaporating the sulfur and subsequently oxidizing a portion of the sulfur to sulfur dioxide under sub-stoichiometric conditions in a first portion of the furnace;
    introducing, to a second portion of the furnace, the sulfur dioxide formed in the first furnace portion and any unoxidized sulfur, the second furnace portion being disposed adjacent to the first furnace portion; and
    subjecting the sulfur dioxide and unoxidized sulfur to post-combustion with the oxygen-containing gas in an inlet of a downstream waste heat boiler.

2. The process as recited in claim 1, wherein the oxygen-containing gas includes air.

3. The process as recited in claim 1, further comprising introducing the oxygen-containing gas into an area of an outlet of the second furnace portion.

4. The process as recited in claim 1, further comprising introducing the oxygen-containing gas tangentially into the first and second furnace portions.

5. The process as recited in claim 4, further comprising introducing the oxygen-containing gas in parallel into the first and second furnace portions.

6. The process as recited in claim 4, further comprising introducing the oxygen-containing gas in opposite directions into the first and second furnace portions.

7. The process as recited in claim 1, further comprising introducing the oxygen-containing gas into the inlet of the downstream waste heat boiler.

8. The process as recited in claim 1, further comprising varying a volume of at least one of the oxygen-containing gas and sulfur so as to adjust a sulfur dioxide concentration in at least one of the first and second furnace portions.

9. The process as recited in claim 8, wherein a sulfur dioxide concentration of about 20 to 21 vol-% is established in the first furnace portion.

10. The process as recited in claim 8, wherein a sulfur dioxide concentration of 6 to 95 vol-% is established in the second furnace portion.

11. The process as recited in claim 10, wherein a sulfur dioxide concentration of 9 to 35 vol-% is established in the second furnace portion.

12. The process as recited in claim 1, further comprising establishing the combustion in the first furnace portion at about 1,000° C. to 1,800° C.

13. The process as recited in claim 1, further comprising establishing the combustion in the second furnace portion at about 1,000° C. to 1,800° C.

14. The process as recited in claim 1, wherein the introducing the sulfur is performed by introducing the sulfur in liquid form to the first furnace portion of the furnace and atomizing the sulfur with the oxygen-containing gas.

15. The process as recited in claim 1, wherein the introducing the oxygen-containing gas is performed by introducing to the first furnace portion of the furnace at one or more positions located one behind the other in an axial direction of the furnace.

* * * * *